2,862,590

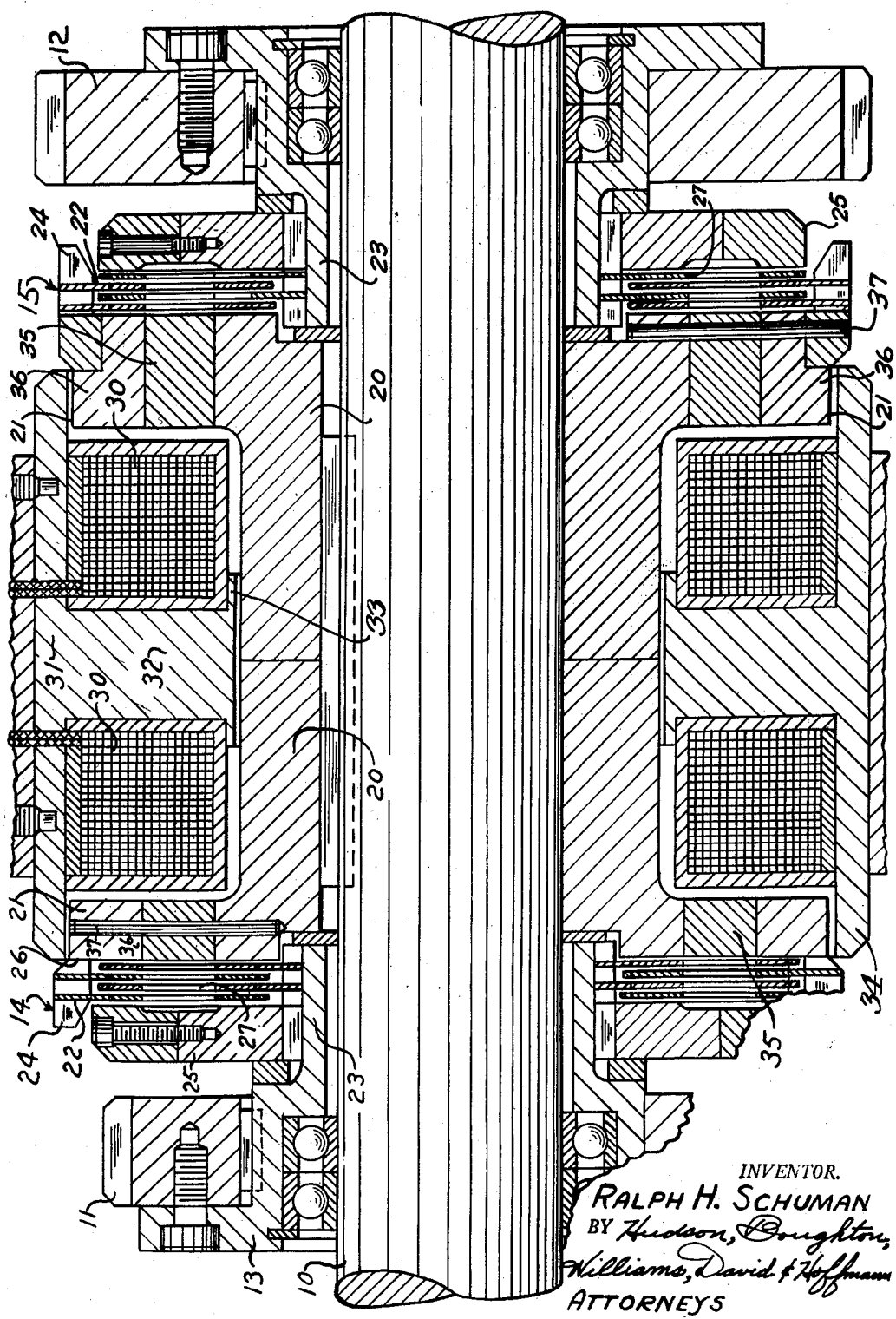

ELECTROMAGNETIC CLUTCH

Ralph H. Schuman, Cleveland, Ohio, assignor to The Warner & Swasey Company, Cleveland, Ohio, a corporation of Ohio Application January 13, 1955, Serial No. 481,601

3 Claims. (Cl. 192—84)

The present invention relates to drive units and, more particularly, to multiple drive units having electromagnetically operated friction clutches of the disk type.

The principal object of the present invention is to provide a new and improved compact drive unit, particularly a dual drive unit, in which a clutch is actuated to one of its positions by a stationary electromagnetic coil positioned about one of the clutch members and wherein the parts are so constructed and arranged that the magnetic flux of the electromagnetic coil for actuating the clutch is efficiently utilized.

Another object of the present invention is to provide a new and improved, compact, multiple speed drive unit in which each member of a pair of spaced members rotatably supported coaxially with a shaft may be selectively connected in driving relationship to the shaft upon the energization of an electromagnetic coil for operating clutch means for connecting the particular member and the shaft, the members and clutch means therefor being so constructed and arranged that the unit is compact, the coils stationary, and the magnetic flux of each coil is efficiently utilized to actuate the particular clutch means operated by the coil.

Further objects and advantages of the present invention will be apparent from the accompanying detailed description of the preferred embodiment thereof taken in conjunction with the accompanying drawing forming a part of this specification and in which:

The figure is a sectional view through a drive unit embodying the present invention.

While the present invention is susceptible of various modifications and of use in various types of machines where it is desirable to interconnect a shaft and a member rotatably supported coaxially therewith, it is of particular use in the field of machine tools and it is herein shown as embodied in a power transmission unit for selectively connecting a drive shaft for a movable element of the machine tool with either one of two gear members rotatably supported on the shaft.

Referring to the drawing, the shaft 10 is adapted to be driven from either one of a pair of gears 11, 12 rotatably supported thereon by collars 13, the gears being driven by suitable power actuated means. A low speed drive for the shaft is provided through the larger gear 12 while a high speed drive is provided through the smaller gear 11, it being understood, of course, that the direction of drive can be reversed with the shaft being the driver and the gears 11, 12 used to provide low speed and high speed drives respectively.

The gears 11, 12 are adapted to be selectively connected to the shaft 10 by respective clutch mechanisms 14, 15 positioned side by side coaxially about the shaft 10 intermediate the gears 11, 12. The clutch mechanisms 14, 15 each include a hub member 20 supported coaxially about and keyed to the shaft 10. The hub members of the two clutch mechanisms are positioned side by side and each have a radially extending flange 21 at the end thereof remote from the other hub member, i. e., at the end adjacent the gear outwardly thereof. The hub members 20 of the clutch mechanisms 14, 15 are adapted to be connected respectively to the gears 11, 12 by clutch or friction disks 22 positioned coaxially with the shaft 10 adjacent to the outer sides of each of the flanges 21.

The clutch disks 22 of each clutch mechanism are supported about a sleeve portion 23 extending inwardly from the collar 13 supporting the gear to be connected to the shaft 10 by the particular clutch mechanism. Alternate disks of each clutch mechanism are connected to the sleeve portion 23 about which they are positioned for movement axially of shaft 10. The other clutch disks of the particular clutch mechanism are connected to projections 24 extending outwardly from the flange 21 of the mechanism for movement axially of the shaft 10. An armature 25 is supported on each sleeve portion 23 for axial movement and each armature is adapted to clamp the friction disks 22 against the outer side 26 of the adjacent or corresponding flange 21, the latter functioning as a clutch back-up or pressure plate.

The gears 11 and 12, together with the collars 13 on which they are mounted, may be said to comprise one of the clutch members of the clutch mechanisms 14, 15 while the hub members 20 and the shaft 10 may be considered as the other and common clutch member of the mechanisms 14, 15.

The clutch disks 22 are preferably of the spring steel type which inherently space themselves from each other when no clamping pressure is applied thereto. The disks are also preferably formed with a plurality of circularly spaced openings 27 for reasons which will appear hereinafter.

The slidable connections between the sleeve portions 23 and the alternate friction disks 22 thereabout and the movable armatures 25 thereon are conventional connections for permitting movement of the armatures 25 and the friction disks 22 axially of the shaft 10.

Each clutch mechanism has a stationary electromagnet including a stationary electromagnetic coil 30 positioned about the hub member 20 thereof adjacent to the inner side of the flange 21 of the hub member. The coils 30 are adapted to be selectively energized to cause the armatures 25 to move toward the corresponding flange 21 to clamp the friction disks 22 therebetween. The electromagnetic coils 30 for the clutch mechanisms 14, 15 are both fixedly supported from the frame of the machine in which the power transmission unit is being used by a single annular or tubular support and core member 31 having an internal radial rib 32 intermediate the coils 30 for engaging and supporting the coils. The inwardly extending rib 32 fits closely about the hub member 20 and is provided with a flange 33 adjacent its internal periphery adapted to overlie the inner peripheries of the coils 30 to support the coils. Clearance is maintained between the hub members 20 and the coils positioned thereabout, as well as between the hub members and the tubular support member 31.

The tubular support member 31 is provided with an axially extending flange portion 34 at each end thereof which overlies the adjacent flange 21 of the corresponding hub member 20, the flange 21 terminating in a radial direction short of the axially extending flange portion 34. The hub members 20 are comprised of material of relatively low magnetic reluctance, with the exception of annular portions 35, preferably aligned with the annular portion of coils 30, forming a part of each flange 21 and spaced from the inner and outer peripheries of the flange. Each flange 21 may be said to comprise three portions: a first portion formed by the body of the hub member; the annular portion 35 of material of relatively high reluctance; and an annular portion 36 which is the outermost portion of the flange and which carries the projections 24 to which alternate friction disks are slidably connected and which is also of low magnetic reluctance. The annular portions 36 and 35 of each flange are held in position on the hub member 20 by means of radial pins 37 extending through the flange 21 and comprised of a material of relatively high magnetic reluctance.

Upon energization of a coil 30, magnetic flux from the coil is guided from the rib 32 through the corresponding hub member 20 to the corresponding armature 25 and then through the projections 24, the annular portion 36 of the flange 21, and flange portions 34 of the tubular member 31 to cause the actuation of armature 25 to a clamping position. By providing the annular portion 35 of high magnetic reluctance within the flanges 21, the flanges provide a radial flux path of relatively high reluctance, preventing the short-circuiting of the armatures 25 and, consequently, the force tending to urge the armature 25 toward its corresponding flange 21 is substantially increased for any given coil and energization thereof. The openings 27 in the clutch disks 22 are also preferably aligned with annular portions of the coils 30 so as to provide a radial path of high magnetic reluctance.

In the illustrated embodiment the hub members 20 for the clutch mechanisms 14, 15 are individual members to facilitate assembly. These, however, may be a single member in the form of a sleeve having flanges at its opposite ends.

It may now be seen that the present invention provides a drive unit, particularly a dual drive unit, having an electromagnetic clutch mechanism or mechanisms for interconnecting a shaft and a member or members rotatably supported thereon, the clutch mechanism or mechanisms being actuatable by stationary electromagnets having stationary coils for creating flux which is efficiently utilized to move the armatures of the respective clutch mechanisms. The arrangement and construction of the various parts of the drive is such that a compact, efficient drive is provided.

Further modifications, constructions and arrangements of the present invention may be made by those skilled in the art without departing from the spirit and scope of the present invention; and it is hereby my intention to cover all such modifications, constructions and arrangements which fall within the scope of the appended claims.

Having thus described my invention, what I claim is:

1. In a drive of the character described, a first clutch member, a second clutch member coaxial with said first clutch member and comprising a sleeve having a radially extending flange at an end thereof adjacent said first clutch member, said flange having inner and outer annular portions of relatively low magnetic reluctance and an intermediate annular portion of relatively high reluctance, disk means intermediate said flange and said first clutch member axially movable to clutch engaged and disengaged positions for selectively connecting said first clutch member and said second clutch member in driving relationship, an electromagnetic coil positioned about said sleeve adjacent the side of the flange opposite said disk means for operating said disk means to one of its positions, an annular core member coaxial with said sleeve stationarily supporting said coil and having a first portion extending radially inwardly on the side of said coil remote from said flange with the radially innermost end of the first portion terminating in a radial direction immediately adjacent said sleeve to provide a small gap and a path of relatively low magnetic reluctance in a radial direction between said sleeve and said first portion and in an axial direction at a point adjacent the side of said coil remote from said flange to provide a gap of high magnetic reluctance in an axial direction between said first portion and said first clutch member and a second portion extending axially from the radially outermost end of said first portion and overlying said flange, said flange terminating in a radial direction short of said second portion and said intermediate annular portion being substantially aligned with said coil.

2. In a drive of the character described, first and second clutch mechanisms having separate coaxial first clutch members and a common second clutch member comprising a shaft coaxial with said first clutch members, means supporting said clutch members for rotation independently of each other, first and second electromagnetic coils for operating said first and second clutch mechanisms respectively and each positioned about one of the clutch members of the clutch mechanism operated thereby, the clutch member about which the coils are positioned extending into the center of said coils and having a radially extending flange adjacent one end of the coil member positioned thereabout, said flanges each having inner and outer annular portions of relatively low magnetic reluctance and an intermediate annular portion of relatively high reluctance, means defining a core member for each of said coils which core member is coaxial with said one clutch member for stationarily supporting said first and second coils and permitting relative rotation between the said one clutch member of said first and second clutch mechanisms and the coils, said intermediate annular portion of each flange being substantially aligned with the adjacent coil, said means defining a core member having first portions extending axially therefrom and overlying the adjacent one of said flanges in close proximity thereto with said flanges terminating radially short of said first portions and a second portion extending radially inwardly on the sides of the coils remote from said flanges to a point in closer proximity radially to said one clutch member than the axial distance between the radially innermost end of said second portion and said one clutch member, said second portion terminating axially adjacent the sides of said coils remote from said flanges, disk means adjacent the sides of said flanges remote from the electromagnetic coil positioned adjacent thereto for interconnecting the one clutch member of said first and second clutch mechanisms with the other member thereof, said disk means being coaxial with said clutch members and axially movable to clutch engaged and disengaged positions and being movable to said one of said positions upon the energization of the corresponding electromagnetic coil.

3. In a drive of the character described, a first clutch member, a second clutch member coaxial with said first clutch member and comprising a sleeve of magnetic material having a radially extending annular portion at an end thereof adjacent said first member, a non-magnetic annulus mounted on said portion, a magnetic annulus mounted on said non-magnetic annulus, non-magnetic pins connecting said annuluses to said annular portion to provide a radially extending flange at one end of said sleeve, disk means intermediate said flange and said first clutch member axially movable to clutch engaged and disengaged positions for selectively connecting said first clutch member and said second clutch member in driving relationship, an electromagnetic coil positioned about said sleeve adjacent the side of the flange opposite said disk means for operating said disk means to one of its positions, an annular magnet body coaxial with said sleeve and non-rotatably supporting said coil and having a first portion extending radially inwardly on the side of said coil remote from said flange with the radially innermost end of said first portion terminating in a radial direction immediately adjacent said sleeve to provide a small gap and a radial path of relatively low magnetic reluctance between said first portion and said sleeve and in an axial direction at a point immediately adjacent said side of said coil remote from said flange to provide an axial gap between said first portion and said flange and a path of high magnetic reluctance direction between said first portion and said flange of first clutch member and a second portion extending axially from the radially outermost end of said first portion and overlying said flange, said flange terminating in a radial direction in close proximity to but short of said second portion.

References Cited in the file of this patent

UNITED STATES PATENTS

| | | |
|---|---|---|
| 821,020 | Cutler | May 22, 1906 |
| 2,039,714 | Fuller | May 5, 1936 |
| 2,253,309 | Smellie | Aug. 19, 1941 |
| 2,267,114 | Lear | Dec. 23, 1941 |
| 2,315,298 | Thompson | Mar. 30, 1943 |
| 2,375,783 | Gilfillan | May 15, 1945 |
| 2,386,402 | Lilja | Oct. 9, 1945 |
| 2,575,360 | Rabinow | Nov. 20, 1951 |

FOREIGN PATENTS

| | | |
|---|---|---|
| 12,259 | Great Britain | of 1910 |